United States Patent [19]

Kawagoe

[11] Patent Number: 4,947,327

[45] Date of Patent: Aug. 7, 1990

[54] VEHICLE STEERING CONTROL SYSTEM WITH DERIVATIVE GAIN ADJUSTING CAPABILITY

[75] Inventor: Kenji Kawagoe, Yokosuka, Japan

[73] Assignee: Nissan Motor Co., Ltd., Japan

[21] Appl. No.: 275,061

[22] Filed: Nov. 22, 1988

[30] Foreign Application Priority Data

Nov. 30, 1987 [JP] Japan ............................ 62-299889

[51] Int. Cl.$^5$ ............................................. B62D 5/00
[52] U.S. Cl. ............................... 364/424.05; 180/141; 180/142
[58] Field of Search .................... 364/424.05; 180/140–142, 79.1; 280/91

[56] References Cited

U.S. PATENT DOCUMENTS

| | | | |
|---|---|---|---|
| 4,666,013 | 5/1987 | Shibahata et al. | 180/141 |
| 4,705,130 | 11/1987 | Fukunaga et al. | 180/140 |
| 4,773,012 | 9/1988 | Ito et al. | 364/424.01 |
| 4,778,023 | 10/1988 | Sugasawa | 180/140 |
| 4,828,061 | 5/1989 | Kimbrough et al. | 180/79.1 |
| 4,837,692 | 6/1989 | Shimizu | 364/424.05 |
| 4,840,389 | 6/1989 | Kawabe et al. | 280/91 |

Primary Examiner—Thomas G. Black
Attorney, Agent, or Firm—Leydig, Voit & Mayer

[57] ABSTRACT

A steering control system for controlling either or both of the front and rear wheel steer angles of a vehicle includes a steering input sensor for sensing a steering input such as a steering wheel angle and an electronic control unit which includes a basic control section for calculating a desired steer angle in accordance with the sensed steering input and a time derivative of the steering input. In order to improve the vehicle stability by eliminating unstable vehicle response to driver's unconscious fluctuating steering operation, the control unit further includes a gain adjusting section for discriminating unconscious operation from intentional steering operation by comparing the time rate of change of the steering input with a predetermined reference level, and for decreasing the gain by which the derivative of the steering input is multiplied in determining the desired steer angle when the time rate of change of the steering input is smaller than the reference level.

9 Claims, 5 Drawing Sheets

PROPORTIONAL CONSTANT (K)

FIRST DERIVATIVE CONSTANT ($\tau$)

SECOND DERIVATIVE CONSTANT ($\tau'$)

GAIN ADJUSTING COEFFICIENT ($\alpha$)

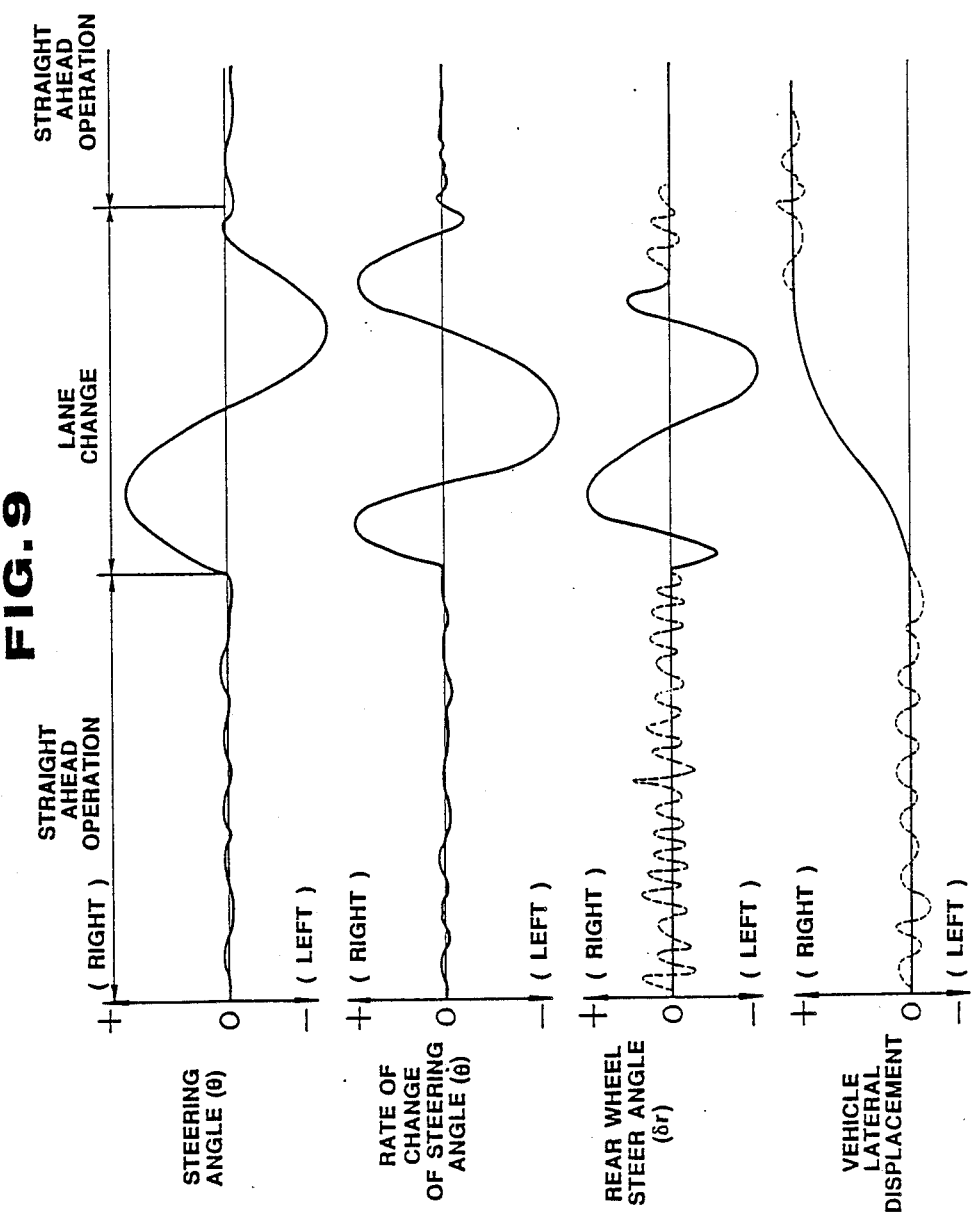

VEHICLE STEERING CONTROL SYSTEM WITH DERIVATIVE GAIN ADJUSTING CAPABILITY

BACKGROUND OF THE INVENTION

The present invention relates to a vehicle control system for actively controlling either or both of the front and rear wheel steer angles.

Recent examples of the steering control systems are shown in Japanese Pat. application No. 62-121015, Japanese Pat. application No 62-120261.

These control systems control the rear wheel steer angle in accordance with a steering angle, a steering angular speed and a steering angular acceleration.

These control systems calculate the rear wheel steer angle by using a mathematical linear combination including a term proportional to the steering angular speed and a term proportional to the steering angular acceleration. Because of this feature, these systems tend to cause unstable behavior of the controlled vehicle especially during steady state operations such as straight ahead operation and steady state turning operation. In steady state operation, the steering wheel is held fixed. However, these control systems are highly sensitive even to fluctuation of the steering wheel due to unconscious operation of the driver. In FIG. 9, the dashed lines show fluctuations in the rear wheel steer angle and vehicle lateral displacement produced in response to fluctuation in the steering wheel angle during straight ahead driving.

SUMMARY OF THE INVENTION

It is therefore an object of the present invention to provide a vehicle steering control system which can elevate undesired fluctuating vehicle response.

According to the present invention, a steering control system of a vehicle comprises three basic elements: actuating means, sensing means and controlling means. The actuating means varies an actual first wheel steer angle of the vehicle in response to a control signal representing a desired first wheel steer angle. The first wheel steer angle may be a rear wheel steer angle or a front wheel steer angle. The sensing means senses a driver's steering operation, and produces a steering input signal representing a steering input. The steering input may be a steering wheel angle, or a steering torque or some other variable quantity representing the magnitude of the driver's steering operation. The controlling means produces the control signal in response to the steering input signal produced by the sensing means. The controlling means comprises basic control means for determining the desired first wheel steer angle in accordance with a product obtained by multiplication between a derivative gain and a predetermined order derivative of the steering input with respect to time, and derivative gain adjusting means for decreasing the derivative gain when the time rate of change of the steering input is smaller than a predetermined order reference value. The predetermined derivative of the steering input is a derivative of a predetermined order which is equal to or higher than one.

BRIEF DESCRIPTION OF THE DRAWINGS

FIG. 9 is a time chart showing effects of the control system of FIG. 1.

DETAILED DESCRIPTION OF THE INVENTION

One embodiment of the invention is shown in FIGS. 1–9. An auxiliary steering system of this embodiment is arranged to control a rear wheel steer angle of a vehicle.

Figure 1:
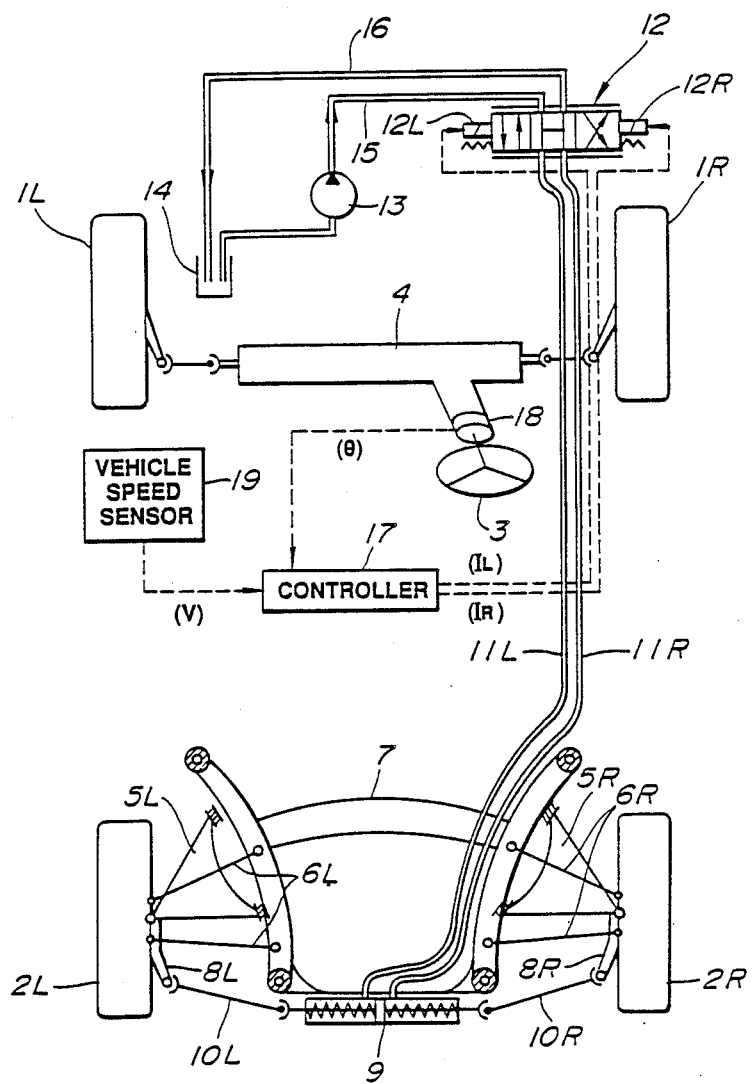
FIG. 1 is a schematic view of a vehicle for equipped with a steering control system according to one embodiment of the invention.

As shown in FIG. 1, the vehicle includes left and right front wheels 1L and 1R, and left and right rear wheels 2L and 2R. A steering wheel 3 is connected through a steering gear 4 with the front wheels 1L and 1R so that a front wheel steer angle $\delta_f$ can be varied by the steering wheel 3 in a conventional manner. The front wheel steer angle $\delta_f$ is expressed as $\delta_f = \theta/N$ where N is a steering gear ratio.

A rear suspension system of the vehicle includes left and right transverse links 5L and 5R, and left and right upper arms 6L and 6R. The rear wheels 2L and 2R are connected through the rear suspension system with a rear suspension member 7 of the vehicle body so that the rear wheels 2L and 2R are also steerable. The left and right rear wheels 2L and 2R are provided, respectively, with left and right knuckle arms 8L and 8R. There is further provided a rear wheel steering actuator 9, both ends of which are connected, respectively, with the left and right knuckle arms 8L and 8R through left and right side rods 10L and 10R.

The steering actuator 9 of this embodiment is a spring center type double acting hydraulic cylinder. Left and right power chambers of the actuator 9 are connected, respectively, through fluid passages 11L and 11R, to an electromagnetic proportional type pressure control valve 12. The pressure control valve 12 is connected through a supply passage 15 and a drain passage 16 with a pump 13 and a reservoir tank 14. The pressure control valve 12 is a spring center type three position valve having left and right solenoids 12L and 12R. When both solenoids are off, both of the passages 11L and 11R are held at a non-pressurized state. When the left solenoid 12L is on, the pressure control valve 12 supplies a fluid pressure proportional to the magnitude of an electric current $I_L$ supplied to the solenoid 12L, to the left power chamber of the actuator 9 through the passage 11L. When the right solenoid 12R is energized, the pressure control valve 12 supplies a fluid pressure proportional to the magnitude of a current $I_R$ supplied to the solenoid 12R, to the right power chamber of the actuator 9 through the passage 11R.

A controller 17 is arranged to turn on and off the solenoids 12L and 12R, and to control the magnitudes of the currents $I_L$ and $I_R$. The controller 17 is connected with a steering input sensor 18 for sensing a driver's steering input, and a vehicle speed sensor 19 for sensing a vehicle speed V of the vehicle. In this embodiment, the steering input sensor 18 is a steering angle sensor for sensing a steering angle $\theta$ which is, in this embodiment, an angular displacement of the steering wheel 3 (a steering wheel angle). The controller 17 receives a steering angle signal from the steering angle sensor 18, and a vehicle speed signal from the vehicle speed sensor 19, and determines the energizing currents $I_L$ and $I_R$ of the solenoids 12L and 12R to steer the rear wheels 2L and 2R by performing a control program shown in FIG. 2.

Figure 2:
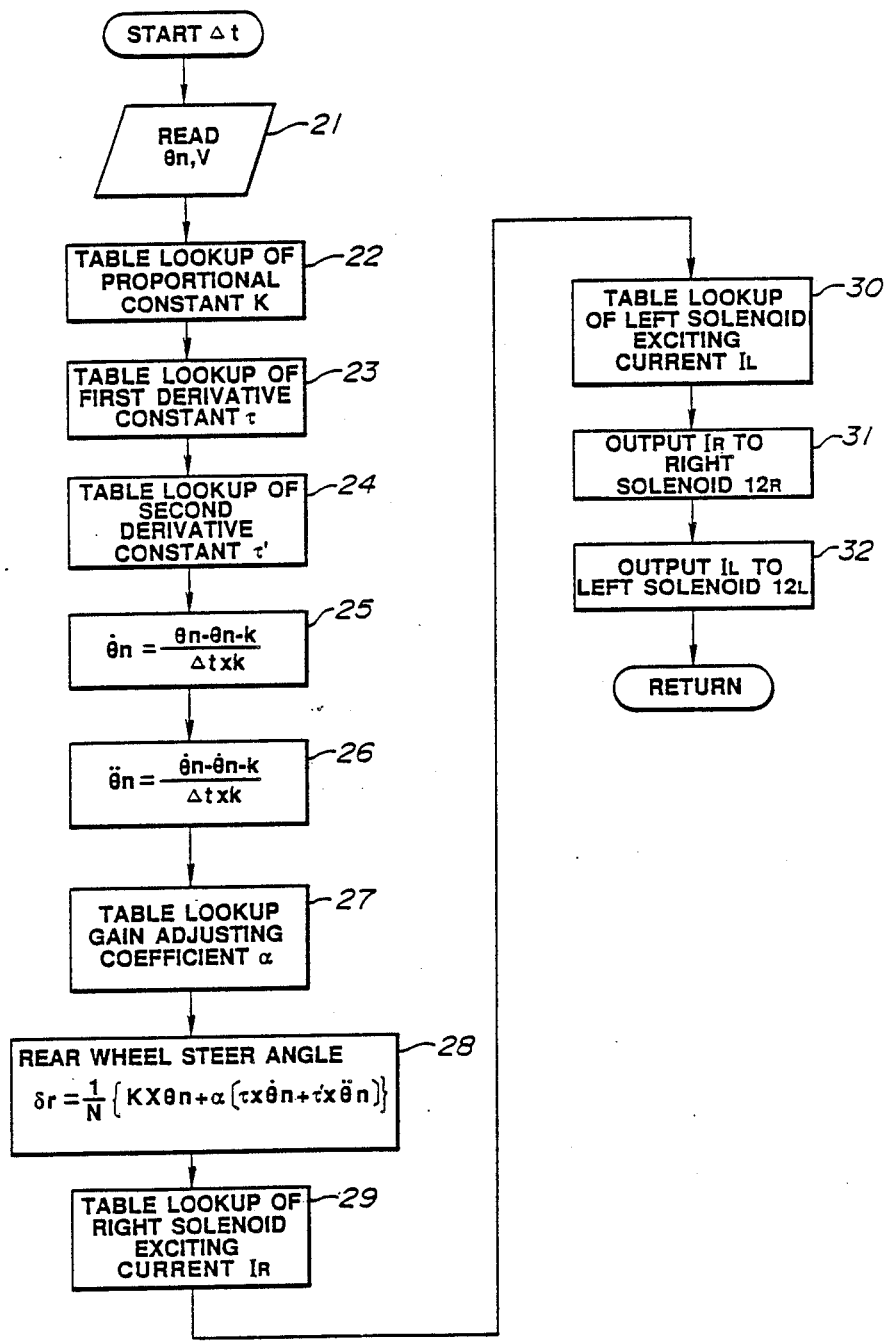
FIG. 2 is a flowchart showing a sequence of operations performed by the controller shown in FIG. 1.

The controller 17 repeats the control program of FIG. 2 regularly at a cycle time $\Delta t$ (for example, 100 msec).

In step 21, the controller 17 reads the current value $\theta_n$ of the steering angle $\theta$ sensed by the steering angle sensor 18 and the current value of the vehicle speed V sensed by the vehicle speed sensor 19.

Figure 3:
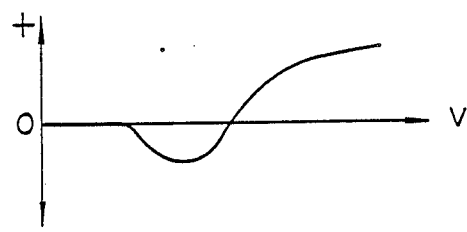
FIGS. 3–5 are graphs showing variations of constants used in the control system of FIG. 1.
Figure 4:
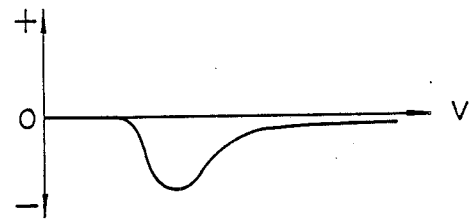
Figure 5:
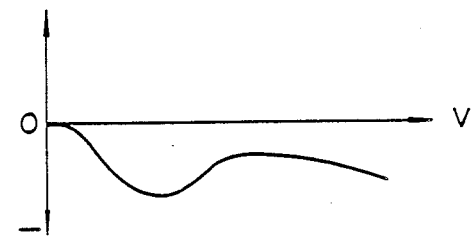

Then, in step 22, the controller 17 obtains the value of a proportionality constant K corresponding to the current value of the vehicle speed V from a table of values of a function shown in FIG. 3. In step 23, the controller 17 obtains the value of a first derivative constant $\tau$ (tau) corresponding to the current value of the vehicle speed V from a table of values of a function shown in FIG. 4. In step 24, the controller 17 obtains the value of a second derivative constant $\tau^1$ corresponding to the current vehicle speed value V from a table of values of a function shown in FIG. 5.

In a step 25, the controller 17 determines the current value of the steering angular speed $\dot{\theta}_n$ which is the time rate of change of the steering angle $\theta$. In this embodiment, the steering angular speed is determined by using the current steering angle value $\theta_n$ obtained during the most recent repetition of step 21, and an old steering angle value $\theta_{n-k}$ which was obtained k times ago. The time interval between the old steering angle value $\theta_{n-k}$ and the current steering angle value $\theta_n$ is equal to $\Delta t$ times k. The controller 17 computes the current steering angular speed $\dot{\theta}_n$ by $$\dot{\theta}_n = (\theta_n - \theta_{n-k})/(\Delta t \times k).$$

In step 26, the controller 17 determines the current value of the steering angular acceleration $\ddot{\theta}_n$ which is the time rate of change of the steering angular speed. In this embodiment, the controller 17 determines the steering angular acceleration $\ddot{\theta}_n$ by $$\ddot{\theta}_n = (\dot{\theta}_n - \dot{\theta}_{n-k})/(\Delta t \times k).$$

In this equation, $\dot{\theta}_n$ is the current value obtained during the most recent execution of step 25, and $\dot{\theta}_{n-k}$ is an old steering angular speed value which was calculated k times ago.

Figure 6:
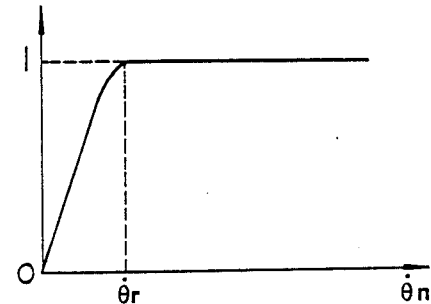
FIG. 6 is a graph of a gain adjusting coefficient alpha as a function of the time rate of change of a steering wheel angle.

In step 27, the controller 17 obtains the value of a derivative gain adjusting coefficient alpha characteristic of the present invention, corresponding to the current steering angular speed value $\dot{\theta}_n$ from a table of values of a function shown in FIG. 6. When the steering angular speed $\dot{\theta}$ is equal to or greater than a predetermined reference value $\dot{\theta}_r$, the gain adjusting coefficient is held equal to one, as shown in FIG. 6. The gain adjusting coefficient decreases from one to zero as the steering angular speed $\dot{\theta}$ decreases from the reference value $\dot{\theta}_r$ to zero, as shown in FIG. 6. The reference value corresponds to the maximum value of the steering angular speed caused by a driver's unconscious fluctuating operation of the steering wheel 3.

In step 28, the controller 17 determines a rear wheel steer angle $\delta_r$ by $$\delta_r = \frac{1}{N} \{K \times \theta_n + \alpha[\tau \times \dot{\theta}_n + \tau' \times \ddot{\theta}_n]\}.$$

The product $\alpha\tau$ in this equation will be referred to as to derivative gain of the first order derivative $\dot{\theta}_n$ and the product $\alpha\tau$ will be referred to as the derivative gain of the second order derivative $\ddot{\theta}_n$. It can be seen that in this embodiment the rear wheel steer angle $\delta_r$ has three components: a component proportional to the steering input $\theta$, a component proportional to the first order derivative $\dot{\theta}_n$ of the steering input, and a component proportional to the second order derivative $\ddot{\theta}_n$ of the steering input.

Figure 7:
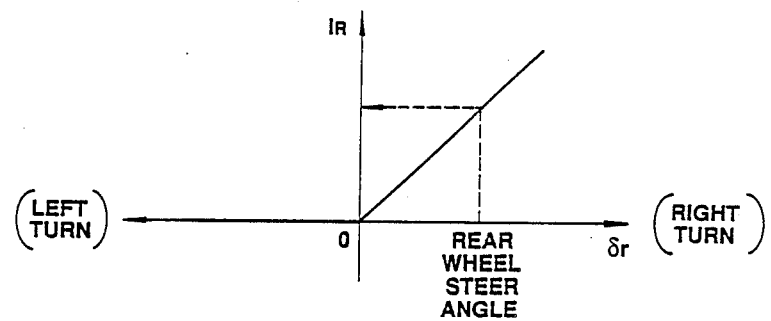
FIGS. 7 and 8 are graphs showing characteristics of right and left solenoid exciting currents versus a rear wheel steer angle.
Figure 8:
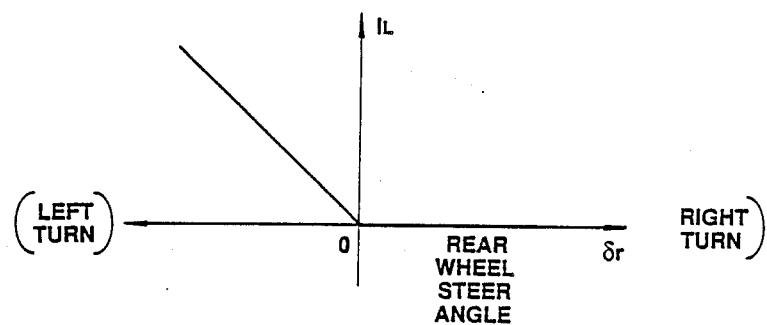

In steps 29 and 30, the controller 17 determines the values of the exciting currents $I_R$ and $I_L$ for the right and left solenoids 12R and 12L, corresponding to the current value of the rear wheel steer angle by using a table corresponding to the graph of FIG. 7 and a table corresponding to the graph of FIG. 8. In steps 31 and 32, the controller 17 sends the current $I_R$ to the solenoid 12R and the current $I_L$ to the solenoid 12L.

Therefore, the right solenoid 12R or the left solenoid 12L is energized, in accordance with the direction of the rear wheel steer angle $\delta_r$, the exciting current $I_R$ or $I_L$ the magnitude of which to the magnitude of the calculated rear wheel steer angle $\delta_r$. As a result, the fluid pressure corresponding to the current $I_R$ or $I_L$ (or the magnitude of the calculated rear wheel steer angle $\delta_r$) is supplied to the rear wheel steering actuator 9 through the fluid passage 11R or 11L, and the actuator 9 causes the rear wheels 2R and 2L to swivel in the direction indicated by the calculated rear wheel steer angle so that the actual rear wheel steer angle is made equal to the calculated rear wheel steer angle.

In order to perform the control program shown in FIG. 2, the controller 17 of this embodiment has a proportionality constant determining means for step 22, a first derivative constant determining means for step 23, a second derivative constant determining means for step 24, a first differentiating means for producing a first derivative signal substantially proportional to the first derivative of the steering angle $\theta$ by executing step 25, a second differentiating means for producing a second derivative signal substantially proportional to the second derivative of the steering angle by executing step 26, a derivative gain adjusting means for determining the derivative gain adjusting coefficient alpha, and a summing means for determining a linear combination of a first term proportional to the steering angle and a second term resulting from multiplication of the derivative gain adjusting coefficient and a derivative factor, which in this embodiment is a sum of the steering angular speed multiplied by the first derivative constant and the steering angular acceleration multiplied by the second derivative constant.

In calculating the rear wheel steer angle, the term including the first derivative of the steering angle $\theta$ and the term including the second derivative of the steering angle $\theta$ are both multiplied by the gain adjusting coefficient which is equal to one when the steering angular speed is equal to or higher than the reference value $\dot{\theta}_r$, and smaller than one when the steering angular speed is lower than the reference value $\dot{\theta}_r$. Therefore, the gain of the derivative control action is decreased when the rate of change of the angular displacement of the steering wheel 3 is lower than the reference value $\dot{\theta}_r$. Thus, the steering control system of this embodiment can prevent unstable behavior of the vehicle due to unintentional fluctuating movement of the steering wheel during a straight ahead operation and a steady state turning operation in which the steering wheel 3 is held at a fixed position.

In a region of high steering angular speed in which the driver turns the steering wheel 3 intentionally and the steering angular speed is equal to or higher than the reference level $\dot{\theta}_r$, the steering control system of the invention can provide the desired steering response without decreasing the gain of the derivative control action. As shown by solid lines in FIG. 9, the steering control system of the invention can keep the required vehicle dynamic characteristic unchanged during lane change operations while still eliminating undesired fluctuations shown by dashed lines in FIG. 9 during straight ahead operations.

The present invention is not only applicable to a rear wheel steering system as in the illustrated embodiment, but is also applicable to a front wheel steering control system for controlling the front wheel steer angle in cooperation with, or without, a steering gear. It is possible, to employ as the steering input a steering torque or the pressure of power steering fluid.

What is claimed is:

1. A steering control system for a vehicle, comprising:
    actuating means for varying an actual first wheel steer angle of the vehicle in response to a control signal representing a desired first wheel steer angle;
    sensing means for sensing a driver's steering operation and producing a steering input signal representing a steering input; and
    controlling means for producing said control signal in accordance with said steering input signal, said controlling means comprising basic control means for determining said desired first wheel steer angle in accordance with a product resulting from multiplication of a derivative gain and a predetermined order derivative of said steering input with respect to time, and derivative gain adjusting means for decreasing said derivative gain when the time rate of change of said steering input is smaller than a predetermined reference value.

2. A steering control system according claim 1 wherein said steering input is a steering angle of said vehicle, and said sensing means comprises a steering angle sensor for sensing the steering angle.

3. A steering control system according to claim 2 wherein said control signal is proportional to a linear combination of a first term proportional to said steering input and a second term proportional to said predetermined order derivative of said steering input.

4. A steering control system according to claim 3 wherein said basic control means comprises first differentiating means for producing a first derivative signal substantially proportional to a first order derivative of said steering input with respect to time, and said desired first wheel steer angle is equal to a linear combination of said steering input and said first order derivative.

5. A steering control system according to claim 4 wherein aid gain adjusting means comprises means for determining a gain adjusting coefficient which is lower than one when said first order derivative of said steering input is lower than said reference value and which is held equal to one when said first order derivative of said steering input is greater than said reference value, and wherein aid basic control means further comprises second differentiating means for producing a second derivative signal substantially proportional to a second order derivative of said steering input with respect to time and summing means for determining said desired first wheel steer angle which is proportional to a sum of said first term obtained by multiplying said steering input by a proportionality constant, and said second term obtained by multiplying said gain adjusting coefficient by a derivative factor which is a sum of said first derivative multiplied by a first derivative constant and said second derivative multiplied by a second derivative constant.

6. A steering control system according to claim 5 wherein said gain adjusting means decreases said gain adjusting coefficient from one to zero as said first derivative of said steering input decreases from said reference value to zero.

7. A steering control system according to claim 6 wherein said sensing means further comprises a vehicle speed sensor for sensing speed of the vehicle, and said basic control means comprises proportionality constant determining means for determining the value of said proportionality constant in accordance with said vehicle speed, first derivative constant determining means for determining the value of said first derivative constant in accordance with said vehicle speed, and second derivative constant determining means for determining the value of said second derivative constant in accordance with said vehicle speed.

8. A steering control system according to claim 7 wherein said first wheel steer angle is a rear wheel steering angle of the vehicle.

9. A steering control system according to claim 1 wherein said sensing means comprises a steering input sensor for sensing a condition of a steering system of the vehicle and producing said steering input signal representing one of a steering angle and a steering torque of the vehicle.

* * * * *

UNITED STATES PATENT AND TRADEMARK OFFICE
CERTIFICATE OF CORRECTION

PATENT NO. : 4,947,327

DATED : August 7, 1990

INVENTOR(S) : Kenji Kawagoe

It is certified that error appears in the above-identified patent and that said Letters Patent is hereby corrected as shown below:

Title page:

In item [56] References Cited, under Foreign Patent Documents add --60-229873 11/1985 Japan ................--.

In the claims column 6, line 15, change "and" to --said--.

Signed and Sealed this

Twenty-first Day of January, 1992

Attest:

HARRY F. MANBECK, JR.

*Attesting Officer*       *Commissioner of Patents and Trademarks*